United States Patent [19]
Orbell

[11] Patent Number: 6,112,763
[45] Date of Patent: Sep. 5, 2000

[54] VALVES

[75] Inventor: Joseph R. Orbell, Hampton, Australia

[73] Assignee: Muriel Ann Orbell, Hampton, Australia

[21] Appl. No.: 09/011,052

[22] PCT Filed: Aug. 2, 1996

[86] PCT No.: PCT/AU96/00486

§ 371 Date: Feb. 2, 1998

§ 102(e) Date: Feb. 2, 1998

[87] PCT Pub. No.: WO97/05337

PCT Pub. Date: Feb. 13, 1997

[51] Int. Cl.[7] ............. F16K 31/20; F16K 33/00
[52] U.S. Cl. ............. 137/398; 137/410; 4/327; 4/395; 4/415
[58] Field of Search ............. 4/324, 325, 326, 4/327, 366, 378, 391, 395, 415; 137/395, 398, 410

[56] References Cited

U.S. PATENT DOCUMENTS

| | | | |
|---|---|---|---|
| Re. 13,330 | 12/1911 | Guyton | 4/378 |
| 3,153,247 | 10/1964 | Walsh | 4/325 |
| 4,025,968 | 5/1977 | Davis | 4/325 |
| 4,305,163 | 12/1981 | Raz | 4/325 |
| 4,651,359 | 3/1987 | Battle | 4/415 |
| 4,748,699 | 6/1988 | Stevens | 4/415 |
| 4,825,478 | 5/1989 | Harris | 4/415 |
| 4,882,793 | 11/1989 | Thompson | 4/325 |
| 4,945,581 | 8/1990 | Harris | 4/415 |
| 5,086,524 | 2/1992 | Stevens | 4/415 |
| 5,103,507 | 4/1992 | Sprajc et al. | 4/415 |
| 5,657,494 | 8/1997 | Diethelm | 4/415 |

FOREIGN PATENT DOCUMENTS

| | | |
|---|---|---|
| 51953 | 5/1980 | Australia . |
| 86065 | 1/1983 | Australia . |
| 91874 | 7/1983 | Australia . |
| 21085 | 5/1984 | Australia . |
| 70147 | 4/1991 | Australia . |
| 68333 | 7/1991 | Australia . |
| 76442 | 11/1991 | Australia . |
| 10608 | 8/1992 | Australia . |
| 13842 | 10/1992 | Australia . |
| 829665 | 9/1975 | Belgium . |
| 90793 | 10/1983 | European Pat. Off. . |
| 2665744 | 2/1992 | France ............... 4/415 |
| 2676480 | 11/1992 | France ............... 4/415 |
| 2717142 | 10/1978 | Germany . |
| 3221747 | 12/1983 | Germany . |

*Primary Examiner*—George L. Walton
*Attorney, Agent, or Firm*—Biebel & French

[57] ABSTRACT

There is described a valve arrangement which in one form is an inlet valve (60) or in another form is a dual flush valve (2). The valves may be used in a variety of situations but find particular application in a cistern for providing water to flush a toilet bowl or similar. The valve arrangement (2) comprises a flushing tube (100) or a pair of flushing tubes (14, 18) which can move axially. One end of the tubes (100, 18) is sealed to an outlet (9). The tubes are provided with rings or collars (16, 22) which co-operatively engage with locking edges (48, 50) of floats (40, 44) to control movement of the tubes (100, 14, 18). The floats (40, 44) are mounted off-center or in a position spaced apart from their respective centers of gravity so that they are free to move under the effects of gravity and the effects of lift provided by buoyancy of the floats. In operation the sequential effects of gravity and buoyancy cause the floats to hold the tubes in position and then release the tubes thereby allowing selective flushing positions.

29 Claims, 6 Drawing Sheets

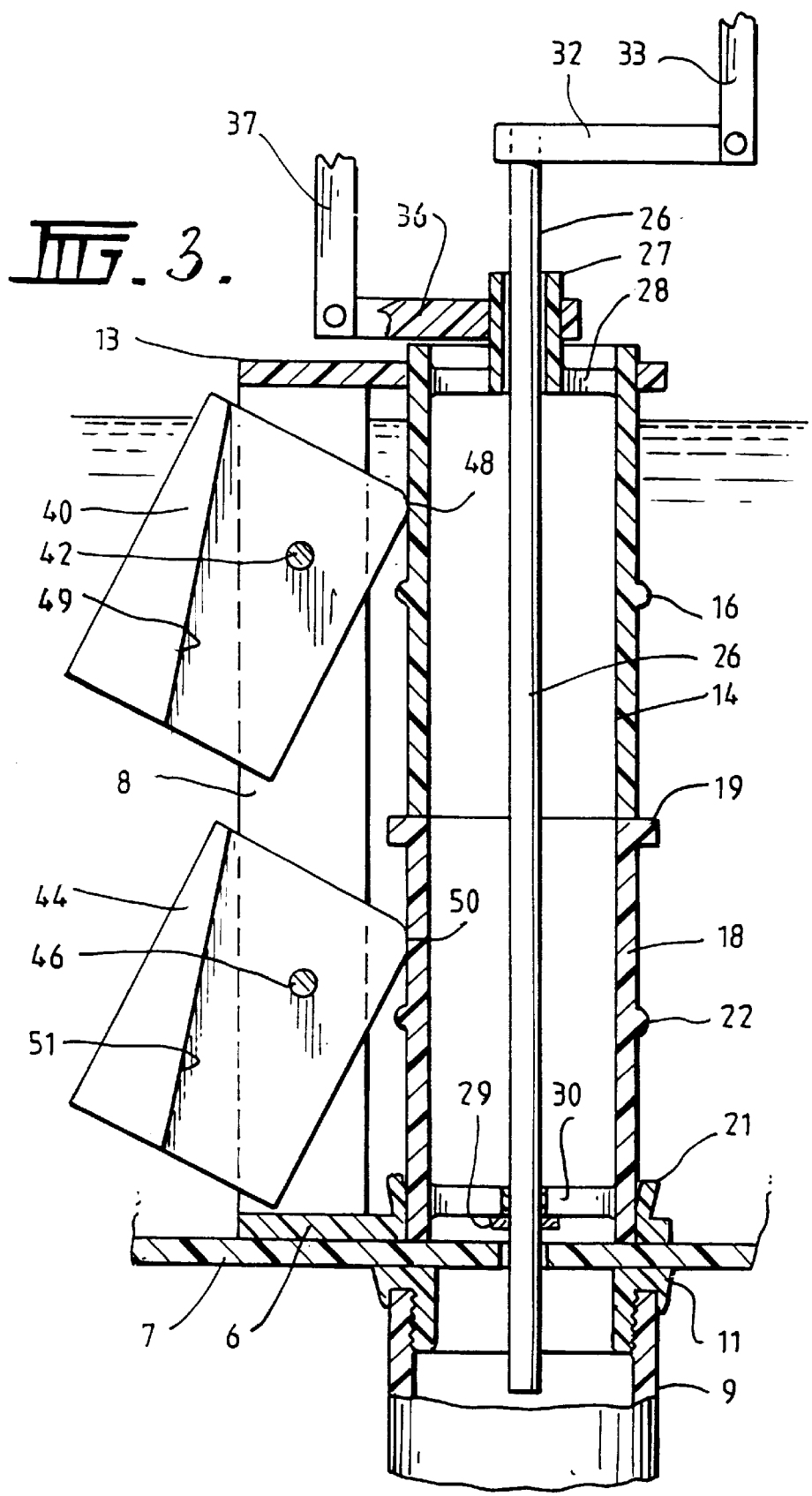

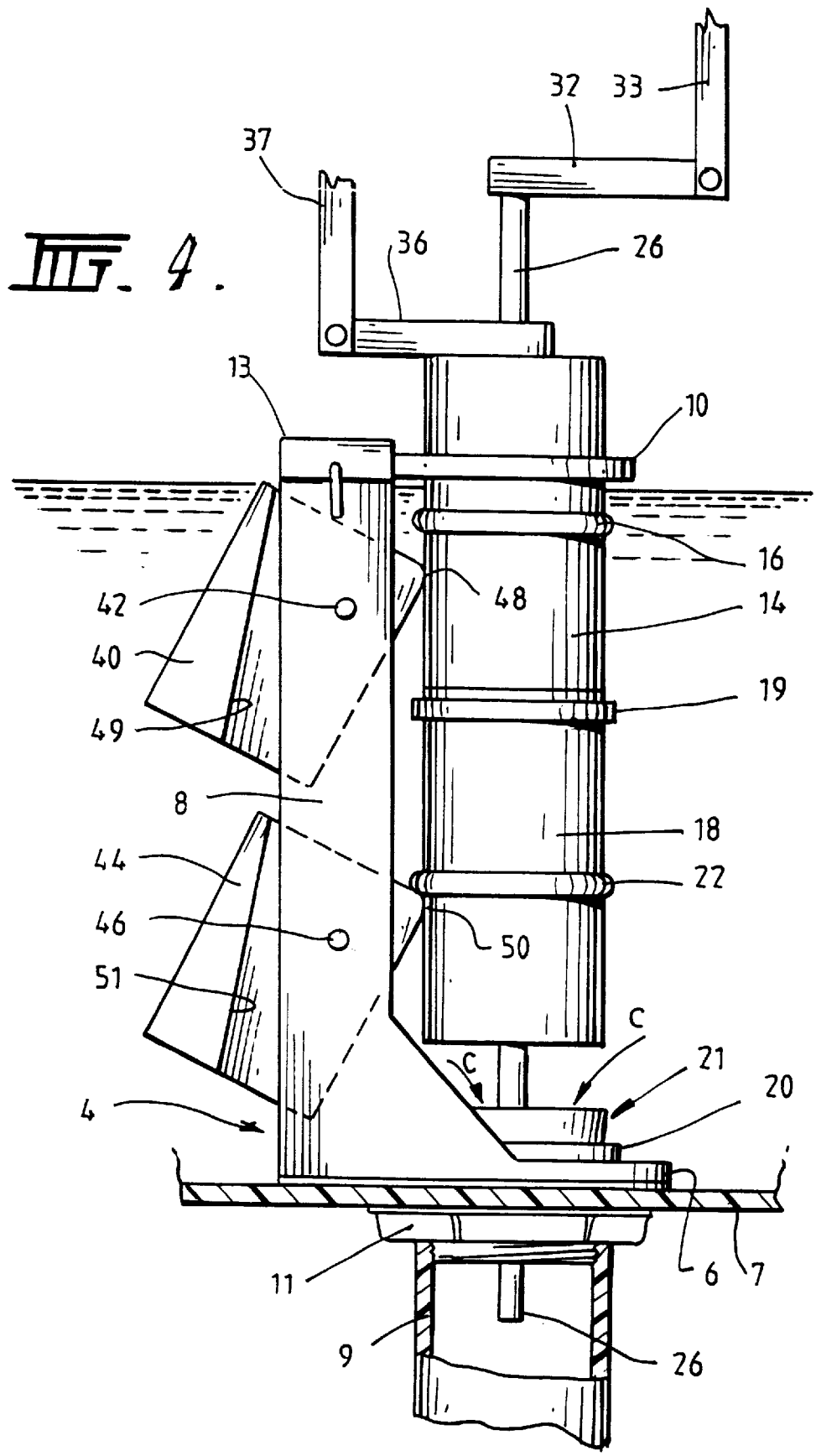

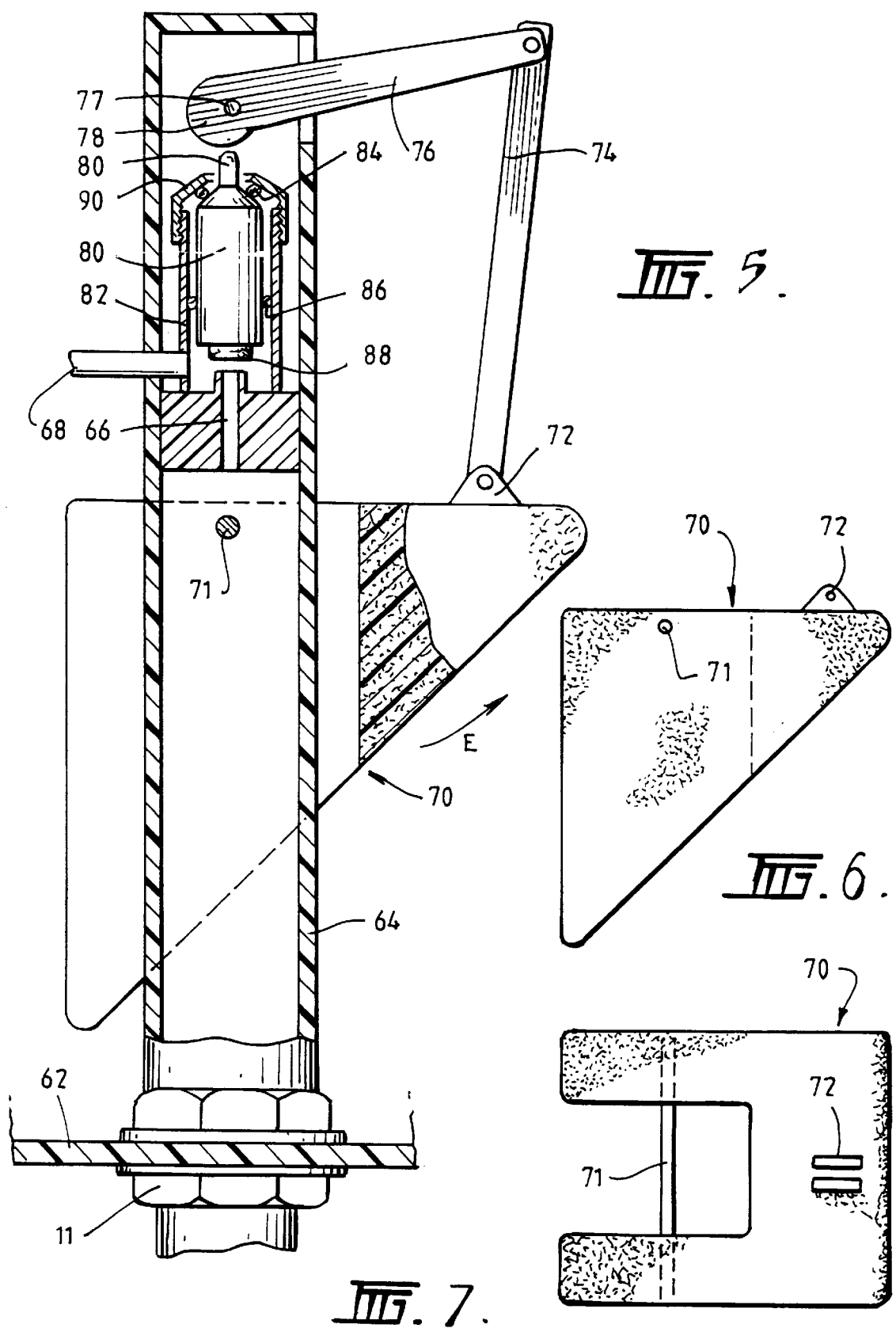

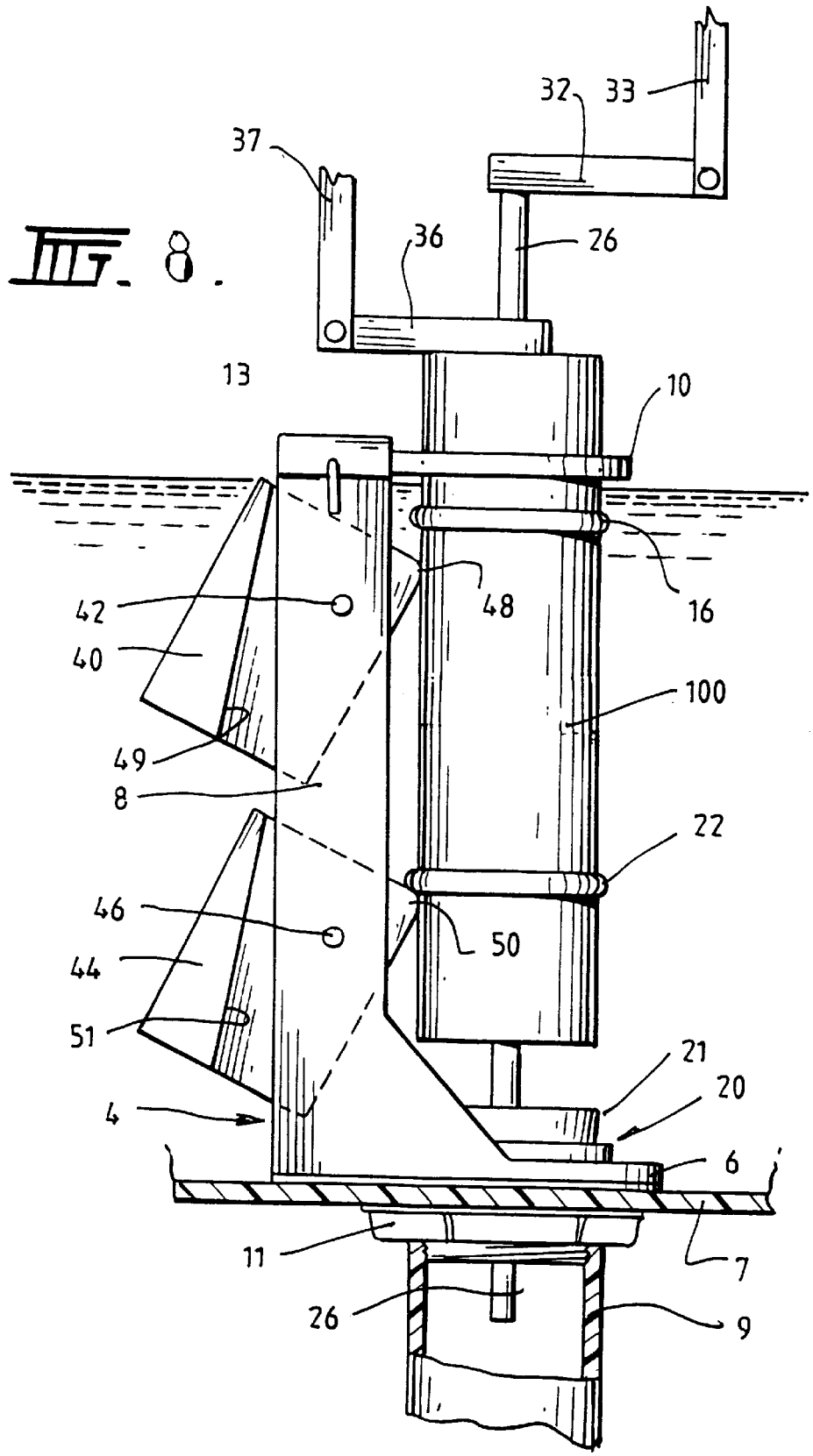

VALVES

The present invention relates generally to valves, in one aspect particularly to valves which are immersed in the fluid the flow of which the valves control, and in another aspect particularly to valves for controlling the flow of fluids through the valve. More particularly, the present invention relates to valves for controlling the flow of liquids, particularly water. Even more particularly, the present invention relates to valves suitable for use in cisterns for flushing toilet bowls and the like, such as inlet valves for admitting water to the cistern, and flushing valves, particularly dual flushing valves, located in cisterns for controlling release of water from the cistern. The present invention finds particular applications as the inlet valve and/or as the dual flush cistern valve having two modes of operation in cisterns located in buildings such as office blocks, hotels, domestic houses or the like.

Although the present invention will be described with particular reference to a cistern having a dual flush valve and/or an inlet valve, it is to be noted that the present invention is not restricted to such arrangements and uses but rather the scope of the present invention is more extensive so as to include other arrangements and uses of the valve than those specifically described.

One problem with existing cistern inlet valves is that such valves operate progressively between the two extreme positions. Therefore, there is a variable flow of water being admitted to the cistern which results in undesirable noise such as that described as the "hissing" effect or noise of water entering the cistern after the toilet bowl has been flushed. This noise results from the inlet valve progressively approaching the fully closed position due to the gradually restricting flow of water. In extreme cases the unwanted noise can continue for lengthy periods of time after the cistern has been valved which can be annoying and aggravating, particularly in en suite situations at night when the cistern is valved which may awaken the sleepers in the adjoining bedroom, or in multiple dwelling buildings.

Another problem associated with currently used valves in cisterns is that they are bulky and complex which results in large amounts of space being occupied by the valve in the cistern, particularly the operating mechanism of the valves. This in turn requires that the cistern be of large size. Large size cisterns reduce the places in which the cistern may be located within a building, and reduce the flexibility of stylists in designing the cistern and the room in which the cistern is to be located.

Another problem associated with single flush valves in that they waste water since they have no provision for reducing the amount of water used during a flush even when it is not required.

Another problem associated with existing cistern valves, particularly dual flush cistern valves, is that they are complex in operation and manufacture, having a large number of separate components which interact together. Not only are such arrangements expensive to make, but also over time the components wear, particularly where adjacent components are connected to each other, such as for example about a pivotal joint, pin or similar, and/or where a sealing element is provided. Wear in the operating or actuating mechanism of the valve and/or in the sealing elements leads to sloppiness of excessive clearances between components which in turn results in leakages or other problems, such as poor sealing of the inlets and outlets, which reduces the efficiency and effectiveness of the cistern and results in all too frequent repairs being required. In many instances, after extreme wear, valves more or less continually drip water or allow water to leak from the cistern, particularly into the toilet bowl, with accompanying unwanted noise, including the annoying hissing noise as the cistern is being continually replenished with water as the valve oscillates between a partially opened position and a closed position. In addition, continual leaking of the cistern results in unsightly staining of the toilet bowl.

Therefore, there is a need to provide a valve arrangement, suitable for use in a cistern, such as a flushing valve, particularly a dual flush cistern valve, which is efficient in operation, made from a reduced number of components, occupies a minimum of space, is silent or almost so in operation, yet is effective in operation, and requires little or no maintenance as well as being inexpensive to build. The same requirements also apply to an inlet valve, particularly an inlet valve which moves quickly and silently between a fully closed and fully opened position and does not cause or result in water hammer or the production of unwanted noise.

According to a first aspect of the present invention, there is provided a valve arrangement comprising at least one movable valve member, said member being movable between an open position and a closed position, and an actuating member for causing operation of the valve member between the open and closed positions, said actuating member being mounted in such a manner that movement of the actuating member in one direction is caused by a first force and movement in a second direction is caused by a second force, such that in one condition of operation of the valve arrangement said first force predominates, whereas in a second condition of operation of the valve arrangement said second force predominates.

Typically, the valve arrangement of the present invention is an inlet valve or a flush valve, more typically a dual flush valve. Typically, the valve is located in a cistern.

Typically, the first movable valve member is a cylindrical tube. Typically, the tube is open at both ends. More typically, the valve member is two open-ended cylindrical tubes located co-linearly with each other. More typically, the respective open ends of the two tubes are sealingly interconnected together.

Typically, the movable valve member or the two or more movable valve members move axially within the cistern.

Typically, with the flush valve the open position allows egress of water to an outlet for discharge of the water. More typically, there are two open positions wherein the first open position corresponds to a full flush in which the outlet is directly opened and a second position is a half flush position in which the outlet is in fluid communication with the or one of the cylindrical tubes, thereby resulting in a half flush. More typically, when there is a single tube, said tube is arranged so that it can adopt two different positions corresponding to two different outlet positions depending on whether it is in the full flush or half flush position. The single tube can be located at two different heights, typically 30 cm above the outlet in the full flush open position and typically 15 cm above the outlet in the half flush open position.

Typically, with the inlet flush the open position of this valve allows water to be admitted to the cistern.

Typically, the actuating member for causing operation of the valve member is a float or other member having a watertight chamber. Typically, the float is provided with a locking edge. More typically, the float is provided with a stop means for limiting the amount of pivotal movement of the float during operation of the valve. More typically, the actuating member is one, two, three or more floats. Typically, the float is made from a plastics material or similar.

Typically, the float is substantially triangular in vertical section and substantially U-shaped in horizontal section. Typically, the float is pivotally connected or mounted within the valve arrangement.

Typically, the actuating member is connected or mounted off centre or is connected at such a position which does not correspond with its centre of gravity, so as to be pivotable about its point of connection. More typically, the float is pivotable under the influence of gravity and is separately pivotable under the effect of buoyancy.

Typically, the first force causing movement of the actuating member is the force of gravity. More typically, the second force is a lift force provided by buoyancy of the float.

Typically, the valve arrangement of the present invention is suitable for use in a cistern. When the cistern is empty, the force of gravity predominates to cause the float to adopt a substantially vertical orientation or a more vertical orientation. More typically, when the cistern is full of water the force due to buoyancy of the float in the water predominates to cause the float to adopt a vertically inclined orientation. More typically, operation of the valve is due to a combination of the forces of gravity and buoyancy, more typically, said forces operating in sequence to return the float to a position ready for further operation.

Typically, the cistern is provided with both a dual flushing valve and an inlet valve which co-operate with each other to effect operation of the cistern in use.

The present invention will now be described by way of example with reference to the accompany drawings in which:

FIG. 3 is a vertical cross-sectional view of the valve arrangement of FIG. 2 in a fully closed position thereby sealing the cistern with the floats in a vertically inclined position in readiness for operation;

FIG. 4 is a side elevational view of the valve arrangement of FIG. 2 in situ in the full flush open position;

FIG. 5 is a schematic side elevational view of another form of a valve arrangement in accordance with the present invention being an inlet valve in the open position with the float arranged vertically;

FIG. 6 is a side elevational view of one form of the float member of the valve arrangement of FIG. 5;

FIG. 7 is a top plan view of the float of FIG. 6; and

FIG. 8 is a side elevational view of a modified form of the dual flush valve of the present invention located in situ in a full flush position.

Figure 1:
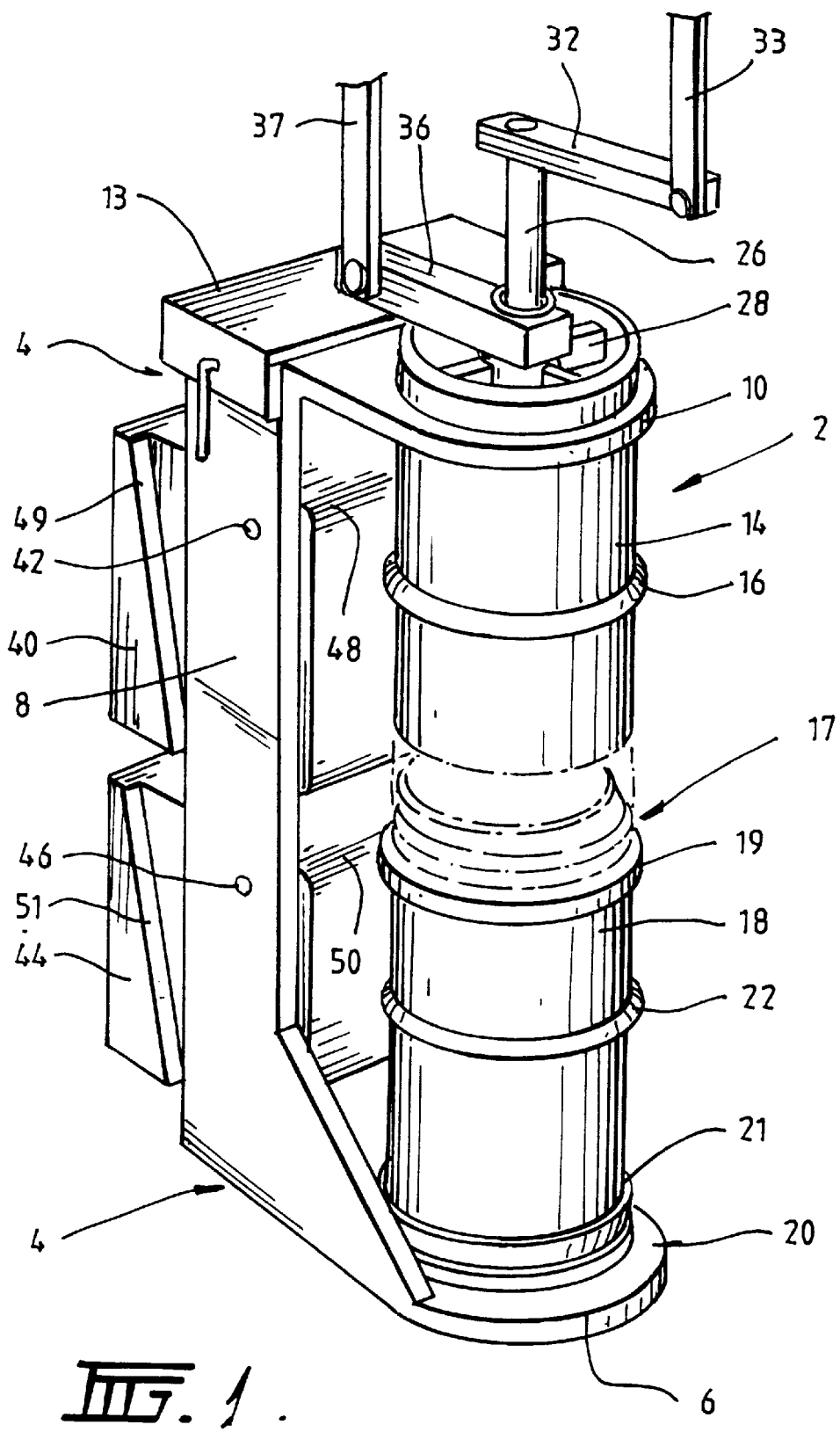
FIG. 1 is a schematic side perspective view of one form of one valve arrangement of the present invention shown in isolation, said valve arrangement being a dual flush valve shown in the fully closed position immediately after flushing with the floats being vertical.

In FIGS. 1 to 4 there is shown one form of a flushing valve arrangement being a dual flushing valve generally denoted as 2. Dual flushing valves are characterised as having two outlets corresponding to two modes of flushing, one being known as a half flush in which a lesser amount of water is discharged to the toilet, and the other being known as a full flush in which almost the entire content of the cistern is discharged to the toilet bowl. Flushing valve 2 comprises a main framework 4 which is securely attached internally within a cistern by suitable means (not shown). Framework 4 comprises a lower horizontal bracket 6 which can be securely fixed to the base or lower surface 7 of the cistern and which assists in securely fixing frame 4 in place.

Bracket 6 is provided with a circular aperture for receiving a lower portion of a flushing tube (to be described in more detail later) which is located directly above the outlet 9 of the cistern by a suitable fastening means such as a threaded tube and nut arrangement 11. Frame 4 further comprises a pair of horizontally spaced apart vertically extending members 8 and an upper support bracket 10 located at or towards the top of vertical members 8 for interconnecting the members 8. A cap 13 is provided at the top of bracket 10 between vertical members 8. Upper support bracket 10 is also provided with a circular opening for receiving the upper end of an upper flushing tube. A first movable valve member in the form of a hollow cylindrical tube 14 being open at either end and acting as an upper flushing tube is received in the circular opening of support bracket 10. Upper tube 14 is free to move axially in bracket 10 between a fully closed position and one of the open flushing positions. Upper tube 14 is provided with upper ring or collar 16 located around its circumference intermediate its ends. Ring 16 may take any suitable profile and be made from any suitable material. Upper tube 14 co-operatively interacts with lower tube 18. The lower end of tube 14 is shown in phantom in FIG. 1 to reveal the internal details of the sealing arrangement 17 between the lower end of upper tube 14 and the upper end of the lower tube 18. The sealing arrangement 17 comprises a substantially V-shape seal or tapered-edges seal 19 provided around the circumference of the upper edge of lower tube 18 so that the lower edge of upper tube 14 is received in the seal to seal the two tubes together and prevent ingress of water internally into the tubes during use when in the fully closed position and the fully opened position.

The lower tube 18 acting as a second movable valve member is arranged in end to end aligned relationship with upper tube 14. A lower ring or collar 22 is provided circumferentially around the outside of lower tube 18 intermediate the ends. The lower end of tube 18 is provided with a seal arrangement 20. Seal arrangement 20 is additionally received within racket 6 and is mounted directly above the outlet 9 of the cistern as is lower tube 18. Seal arrangement 20 is provided with a substantially v-shaped seal or tapered-wall seal 21 in which the lower edge of lower tube 18 is received for sealing the cistern against outflow of water in the fully closed position.

It is to be noted that the spacing of the upper ring 16 from the lower end of upper tube 14 is different to the spacing of lower ring 22 from the lower end of lower tube 18. Lower tube 18 is able to move axially between a fully opened position and a fully closed position.

A central rod 26 is located axially within the aligned upper and lower tubes 14, 18 and extends beyond the ends of both tubes at either end. Rod 26 is maintained in place by being received through centrally located apertures 27, 29 of spiders 28, 30 located at or towards the upper end of upper tube 14 and the lower end of lower tube 18 respectively. Spiders 28, 30 may be formed integrally with the tubes 14, 18 or may be made separately and assembled with the tubes. Actuating lever 32 is connected at one end to central rod 26 and at the other end to push rod 33 to effect movement of central rod to effect full flush of the valve in which the valve is in the fully opened position. The other end of push rod 33 is connected to full flush button or similar (not shown) provided on the cistern. Actuating lever 36 is connected at one end to the top of spider 38 and at the other end to push rod 37 to effect movement of upper tube 14 to effect half flush of the valve in which the valve is only half opened by tubes 14 and 18 being separated from each other. The other end of push rod 37 is connected to half flush button (not shown) or similar provided at a convenient remote location on the cistern.

An upper float 40 is pivotally connected to frame 4 at or towards the upper end of vertical member 8 by means of a pivot pin 42 or similar. A lower float 44 is pivotally connected to framework 4 at a position intermediate the ends of frame member 8 but located more towards the lower end by a pivot pin 46 or similar. Upper and lower floats 40, 44 are free to pivot between two different operating positions, one position being the fully closed position adopted when the cistern full of water and the other position being for locking either tube 14 or tube 18 in the open position.

Floats 40, 44 are airtight so as to define a closed chamber and are pivoted off centre so that the pivot point does not coincide with the centre of gravity or the centre of lift. In this manner floats 40, 44 are free to pivot to adopt a more vertical position or substantially vertical position under the influence of gravity when the cistern is empty and are free to pivot to adopt an inclined position when the cistern is full of water or in either of the flush positions.

Figure 2:
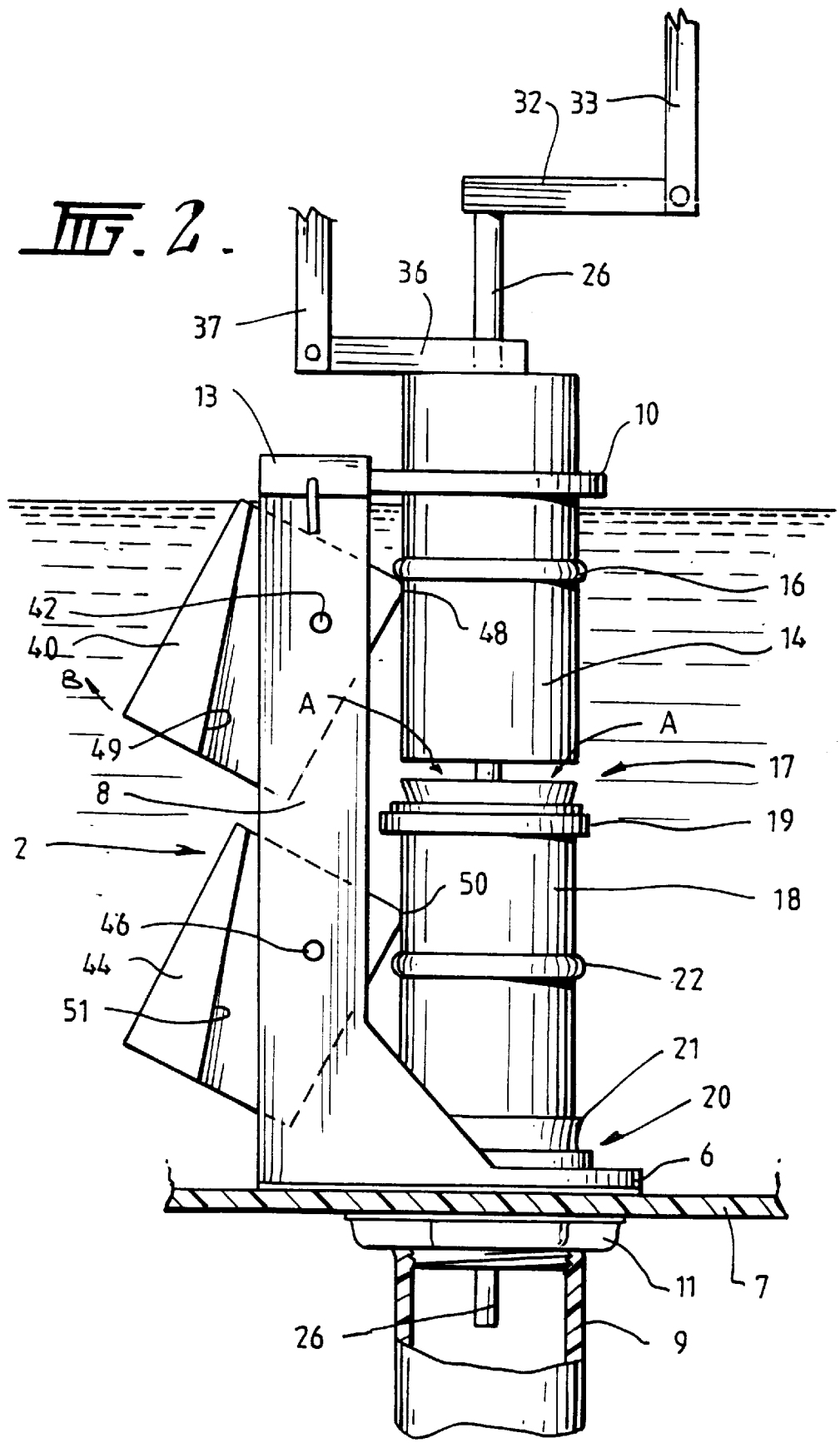
FIG. 2 is a side elevational view of the form of the valve arrangement of FIG. 1 located in situ in the half flush open position allowing a half flush of the cistern.

The normal in use position of the floats 40, 44 when the cistern is full of water is such that they adopt an inclined position with respect to frame member 8 as shown in FIGS. 2 to 4 due to the buoyancy of the air filled floats. In operation, the floats 40, 44 move to a less angularly inclined position such as a more vertical position as shown in FIGS. 1 to allow the valve members 14, 18 to return to their closed positions depending on the mode of flushing the cistern. Float 40 is provided with a locking edge 48 along the upper inboard edge facing upper tube 14 for co-operatively engaging upper ring 16 in use, and a shoulder 49 extending obliquely along one side edge for engaging with the edge of frame member 8 to limit the movement of float 40. Float 44 is provided with a similar locking edge 50 along the upper inboard edge facing lower tube 18 for co-operatively engaging lower ring 22 in use, and a shoulder 51 extending obliquely along one or both opposite sides for engaging with the edge of frame member 8 to limit the pivotal movement of float 44 in the anti-clockwise direction.

The operation of the valve arrangement of the present invention will now be described, starting with the half flush operation. In operation of a half flush of flushing valve 2 of the present invention, the cistern is full of water up to the level shown in FIGS. 2 to 4, which level is close to the top of upper tube 14. It is to be noted that the level of water is below the level of the upper edge of the open topped inlet tube 14 and is about the level of upper bracket 10 of frame 4. When the cistern is full floats 40, 44 adopt an angularly inclined position as shown in FIGS. 2 to 4 with the respective actuating corners 48, 50 of floats 40, 44 respectively in contact with the side wall of the two inlet tubes 14, 18, particularly as shown in FIG. 3. In this condition the position adopted by valve 2 in FIG. 3, which is the fully closed position, is such that upper tube 14 is sealed to lower tube 18 which is sealed to outlet 9 thus containing water in the cistern and preventing any discharge of water from the cistern to the toilet. This is the normal position of the cistern in a state where it is ready for operation. Water is admitted to the cistern through a separate inlet valve, details of which will be described below.

When it is desired to half flush the cistern, the half flush button on the cistern is pushed thereby actuating push rod 37 and lever 36 to lift tube 14 out of sealing engagement with tube 18 and breaking seal 17 to separate the lower end of tube 14 from the upper end of tube 18 since tube 18 remains in place in sealing engagement with seal 20. By this operation, tube 14 is lifted sufficiently to allow ring 16 to pass locking edge 48 of float 40 by float 40 pivoting very slightly in the clockwise direction and returning to its former position so that edge 48 rests against and under supporting ring 16 to lock tube 14 in spaced apart relationship from tube 18 as shown in FIG. 2. In this position water is free to flow through the gap between the two tubes as shown by arrow A of FIG. 2. It is to be noted that tube 18 is undisturbed in this operation and remains sealingly engaged to the outlet 9 of the cistern.

As the level of the water drops to below float 40 which is also to a level corresponding to about the top of tube 18, the lift provided to float 40 due to buoyancy is no longer acting. Owing to float 40 being pivoted off centre, float 40 pivots of its own accord under the influence of gravity in an anti-clockwise direction thus moving the edge 48 and releasing ring 16 from being locked by edge 48 to adopt a position as shown in FIG. 1. It is to be noted that float 40 is prevented from pivoting too far by edge 49 contacting frame 8. As ring 16 is released tube 14 falls under gravity to re-establish sealing contact with tube 18 and form a seal with seal 19. Water is then admitted to the cistern by a suitable inlet valve (to be described in more detail later) whereupon the level of water in the cistern rises to the former level. The rising water level provides lift to float 40 thereby allowing float 40 to pivot in a clockwise direction as shown in arrow B of FIG. 2 to adopt an angularly inclined position in preparedness for the next half flush of full flush. It is to be noted that when the cistern is empty float 40 is vertical whereas when the cistern is full float 40 is vertically inclined.

In operation of the full flush mode of the flushing valve 2 of the present invention, when the cistern is full the water level is as described previously. The full flush button of the cistern is pushed which moves push rod 33 which in turn activates lever 32 to lift central rod 26 which is connected to lower tube 18 by spider 30 and aperture 29 thus lifting tube 18 out of sealing engagement with seal 20 by lifting tube 18 from seal 21 to expose a gap therebetween through which water may flow to outlet 9 as shown by arrow C of FIG. 4. Tube 18 is lifted sufficiently for ring 22 to clear edge 50 of float 44 to allow edge 50 to rest against and under ring 22 to support tube 18 in the fully open position and maintain the valve in this position until the level of the water in the cistern falls below the lower edge of float 44 which is above the level of the outlet 9. It is to be noted that as tube 18 is lifted so also is tube 14 so that the seal between tubes 14 and 18 is maintained at all times during the full flush mode of operation and the only outlet for the water is through the bottom of the cistern. It is noted that during this operation float 40 also pivots. However there is no effect on operation of the device since in this mode of operation float 40 does not contact ring 16 due to the different spacings of ring 22 from float 44 and ring 16 from float 40. Further, it is to be noted that the positions of rings 16, 22 are such that tubes 14, 18 will be retained in one of two positions—either the full flush position, or the half flush position. It is not possible for the locking edges of both floats to lock both tubes simultaneously.

As float member 44 is mounted similarly to the mounting of float 40, float 44 pivots anti-clockwise in accordance with the force of gravity to release ring 22 and allow tube 18 to gravitationally fall thus resealing outlet 9. An inlet valve then operates to admit water into the cistern so that the level rises past float 44 and then past float 40 whereupon each float in turn pivots clockwise to assume their former positions respectively with edge 50 resting against tube 18 and edge 48 resting against tube 14 but at locations above the respective positions of rings 16, 22.

Another form of the valve arrangement of the present invention will now be described, being an inlet valve 60 which is located inside the cistern (not shown). The base or lower surface 62 of the cistern is provided with an aperture through which a stand pipe 64 is received and sealed thereto with a conventional sealing filling. Stand pipe 64 is connected to the normal pressurised water supply and supplies water internally into the cistern. Supply of the water to the cistern is controlled by operation of inlet valve 60.

Valve 60 is located at the top of stand pipe 64 immediately above water entry orifice 66 and delivery pipe 68 provided with a spout (not shown) or similar nozzle for dispersing the energy of the incoming water thus resulting in silent operation of the valve. Valve 60 comprises a float 70 which is generally right angle triangular in vertical cross section and generally U-shaped in horizontal section as shown in FIGS. 6 and 7. Float 70 is arranged so that stand pipe 64 is located in the cut-out of the "U" and is pivotally connected to the stand pipe with one of the sides of the triangular float being substantially vertical, another side being substantially horizontal, said sides being arranged substantially perpendicular to each other, and the third oblique side being angularly inclined to the other two sides. However, it is to be noted that the precise shape of the float can be varied. In the normal position, which is to say the prepared-for-operation position when the cistern is full, the float is angularly inclined to the stand pipe which is a position in which the flat is pivoted in an anti-clockwise direction from that shown in FIG. 5. Float 70 is provided with a yoke 72 at a position along its upper side in use towards the apex of the horizontal side with the oblique side. An actuating lever 74 or lever 76 or push rod or similar force or motion transmitting device or linkage is connected to the yoke at one end and is provided with or connected to a cam 78 at the other end. The link and cam arrangement is such to allow the cam 78 to bear upon the upper end of plunger 80 located in a suitable housing 82 forming a plunger valve. It is to be noted that a single lever provided with a roller wheel at each end can be used in place of the pair of levers 74, 76 and cam 78. In this embodiment, one of the roller wheels acts directly on plunger 80 of the plunger valve.

Two "O" rings 84, 86 are provided between plunger 80 and housing 82 to seal the housing and prevent water from escaping from the housing. A pad 88 is provided at the lower end in use of plunger 80 for selectively closing and opening water entry orifice 66 and thus regulating the flow of water from stand pipe 64 to delivery pipe 68 through water entry orifice 66. Housing 82 is provided with an adjustable threaded cap 90 for adjusting the amount of travel of plunger 80 so that a gap exists between the top of plunger 80 and cam 78 while the float 70 is in its vertical position allowing water into the cistern, yet allows sealing contact between pad 88 and orifice 66 when the valve is in the closed position. One modification of the plunger valve is to provide the valve with a mechanical lock so that excessive water pressure will not force the valve to inadvertently open or leak.

In operation of this form of the inlet valve 60, when the cistern is empty float 70 is in the vertical position or in a substantially vertical position as shown in FIG. 5 so that cam 78 is spaced apart from plunger 80 thus releasing pad 88 from orifice 66 allowing water to flow from stand pipe 64 through orifice 66 to delivery pipe 68 into the cistern. As the level of water in the cistern increases to around where float 70 is located, the lift applied to float 70 overcomes the effect of gravity on float 70 so that flat 70 rotates in an anti-clockwise direction as shown by arrow E of FIG. 5. As the level of water rises the centre of lift or pressure moves from left to right, as shown in FIG. 5, of a position immediately below the pivot point causing the float to rotate in an anti-clockwise direction with increasing force. Movement of float 70 causes yoke 72 to raise along with levers 74, 76 which causes lever 76 to pivot about pivot 77 so that cam 78 comes into contact with plunger 80. As cam 78 moves further around plunger 80 is pushed further into housing 82 so that pad 88 is forced into contact with the end of orifice 66 to stop the flow of water into the cistern. As pivoting movement of float 70 is almost instantaneous the closing of orifice 66 is instantaneous thereby eliminating the "hissing" noise as the valve is progressively closed in prior art cisterns.

In one embodiment the roller wheels are used to eliminate any unwanted friction.

In FIG. 8 there is shown a modified form of the dual flush valves of FIGS. 1 to 4 which modified valve is similar to the valve of FIGS. 1 to 4 except that a single tube 100 replaces upper tube 14 and lower tube 18. Accordingly, the same reference numerals will be used for corresponding features in FIG. 8 as are present in FIGS. 1 to 4. Additionally, as tube 100 is a single tube extending from bracket 6 to bracket 10 and axially movable therebetween in use there is no sealing arrangement 17 or seal 19. Tube 100 operates in the same way as tubes 14 and 18 in that tube 100 may be lifted a small amount, such as for example 15 mm from seal 20 to adopt a half flush position or a larger amount, such as for example about 30 mm, to adopt a full flush position.

In operation of this modified valve arrangement the cistern is full of water as indicated by the water level in FIG. 8. When a half flush is required, tube 100 is lifted by operation of push rod 37 and lever 36 so that ring 16 is locked by edge 48. In this position the lower end of tube 100 is spaced about 15 mm from outlet 9 so that water flows through the outlet at a reduced rate until the level of the water reaches to just below float 40 whereupon float 40 pivots anti-clockwise to disengage edge 48 from ring 16 and allow tube 100 to gravitationally fall to re-establish seal 20 and thus the valve adopts a fully closed position after delivering a half flush. It is to be noted that as ring 22 is located relatively further away from edge 50 than ring 16 is from edge 48, edge 50 does not lock against ring 22 but rather ring 22 is located below edge 50 and therefore float 44 is inoperative in the half flush mode. After the half flush mode, inlet valve 60 operates to fill the cistern again and float 40 is caused to adopt its "ready" position which is as shown in FIG. 8.

When it is desired to full flush the cistern, push rod 33 and lever 32 are operated to lift tube 100 a greater amount so that lock edge 50 engages against ring 22 to lock tube 100 about 30 mm above outlet 9. In this position corresponding to the full flush, water flows through outlet 9 at a greater rate. It is to be noted that in the full flush position ring 16 is located above the position of lock edge 48 and hence float 40 is inoperative in the full flush position. As the water level lowers in the cistern to just below float 40, float 40 pivots anti-clockwise under the influence of gravity but as ring 16 is located above edge 48 there is no effect produced by the movement of float 40 and tube 100 is still maintained in the full flush open position by edge 50 against ring 22. The water level continues to fall until just below float 44 which then pivots anti-clockwise to release ring 22 and allow tube 100 to fall gravitationally into seal 20 to re-establish the seal. Inlet valve 70 then operates to fill the cistern and both floats 44 and 40 pivot clockwise to the "ready" position in turn under the effect of buoyancy as the water level rises past each in turn.

Advantages of the inlet valve of the present invention are that the inlet valve is unique in construction in that it is either in the fully open position or in the fully closed position, there being no delayed progressive movement between the two extreme positions, but rather there is only instantaneous operation between the two positions. The inlet valve has no intermediate stops or delays. This advantage has been achieved by designing a hydrodynamic float which will remain in the fully open position, that is in which the float extends vertically downwards as disclosed in FIG. 5, until the rising water in the cistern reaches a predetermined level when the valve will move freely and effortlessly without sound to the fully closed position thereby stopping the flow of water into the cistern. Additionally, even though the valve moves quickly between the open and closed positions, there is no water hammer produced.

The float moves a lever so designed that it produces, by a compounded mechanical advantage, considerable force on the opening of orifice 66.

when the valve is in the open position water enters via the delivery pipe from where it is sprayed onto the cistern wall at a preset angle and at a constant rate. The nozzle through which the water is sprayed is designed so that the energy of the incoming water is absorbed by the side wall or the cistern resulting in no noise.

As the flow rate of water being admitted to the cistern throughout the filling period is constant, it is possible to eliminate the irritating hissing noises associated with conventional cisterns which employ a progressively closing valve.

Another advantage of the present invention is that the "horse-shoe" horizontal section of the float permits a wrap-around effect of the vertical stand pipe, thus reducing the space required for the components of the valve and for operation.

It is to be noted that the inlet valve of the present invention and the dual flushing valve may be arranged together within the same cistern so that both valves operate in combination with each other.

A further advantage of the dual flushing valve of the present invention, particularly the valve of FIG. 8, is that a reduced number of components are employed and further there is only a single seal required, which contributes to the low cost of manufacture and the reliability of the valve arrangement.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

What is claimed is:

1. A dual flush valve arrangement for use with or in a toilet cistern, having at least two discharge conditions allowing either partial discharge or substantially full discharge of the toilet cistern, said valve arrangement comprising at least one movable valve member, movable in the lengthwise extending direction of the valve member or members between selective open positions and a closed position, said selective open positions corresponding to a partial flush and a substantially full flush position, said at least one movable valve member having a first engaging means and a second engaging means located at spaced apart positions along the length of the movable valve member or members, said first engaging means for co-operatively engaging with a first actuating member to maintain the movable valve member or members in the first of the selective discharge positions, and the second engaging means for co-operatively engaging with a second actuating member to maintain the movable valve member or members in a second of the selective discharge positions, said actuating members being mounted with respect to the movable valve member so that the actuating members act directly on the engaging means so that movement of the actuating members in a first direction to maintain the movable valve member or members in either one of the selective discharge positions is effected by operation of a first force and movement of the actuating members in a second direction to disengage the actuating members from the engaging means, thereby allowing the movable valve member or members to move to the closed position is effected by operation of a second force, wherein operation of the actuating member in the first direction results from the first force predominating, whereas operation of the valve arrangement in the second direction results from said second force predominating, such that when the at least one movable valve member is caused to move from the closed position to either one of the selected discharge positions the selected engaging means engages directly with the selected actuating member to retain the valve arrangement in the selected discharge position until operation of the actuating member under the influence of the second force returns the valve arrangement to the closed position.

2. A valve arrangement according to claim 1 in which the at least one movable valve member is a tube, preferably a substantially hollow tube, and more preferably a substantially cylindrical hollow tube.

3. A valve arrangement according to claim 2 in which the tube is open at both ends.

4. A valve arrangement according to claim 3 in which the at least one movable valve member is at least two open-ended, hollow tubes located axially in end to end relationship with each other.

5. A valve arrangement according to claim 4 in which respective one open ends of the two tubes are sealingly interconnected together when the valve arrangement is in one of the discharge positions.

6. A valve arrangement according to claim 3 in which there is a single movable valve member.

7. A valve arrangement according to claim 3 in which the valve member or members can adopt two discharge positions such that when in either of the first and second discharge positions, fluid can be discharged through the outlet directly.

8. A valve arrangement according to claim 3 in which the movable member can adopt two open positions, such that when in the first open position the movable member is spaced from the outlet a first distance, and when in the second open position the movable member is spaced from the outlet a second distance.

9. A valve arrangement according to claim 8 in which the first distance corresponds to the full flush position and the second distance corresponds to the partial flush position.

10. A valve arrangement according to claim 8 in which the first distance is about 30 mm and the second distance is about 15 mm.

11. A valve arrangement according to claim 9 in which the first distance is about 40 mm and the second distance is about 15 mm.

12. A valve arrangement according to claim 1 in which the actuating member is a float or other member having a watertight chamber or similar capable of acting under the influence of the force of buoyancy.

13. A valve arrangement according to claim 12 in which the float is provided with a locking edge, said locking edge for co-operatively engaging with the engaging means of the movable member.

14. A valve arrangement according to claim 12 in which the float is provided with a stop means for limiting the amount of pivotal movement of the float during operation of the valve.

15. A valve arrangement according to claim 13 in which the float is provided with a stop means for limiting the amount of pivotal movement of the float during operation of the valve.

16. A valve arrangement according to claim 14 in which there are two floats, one float for engaging the engaging means to maintain the movable valve member in the partial flush position, the other float for engaging the engaging means to maintain the movable valve member in the full flush position.

17. A valve arrangement according to claim 12 in which the float is substantially cubic, cube-like or cuboidal.

18. A valve arrangement according to claim 12 in which the float is substantially triangular in vertical section.

19. A valve arrangement according to claim 12 in which the float is substantially U-shaped in horizontal section.

20. A valve arrangement according to claim 12 in which the float is connected or mounted to a support off-centre or spaced apart from the centre of gravity or mass of the float, or in such a manner to be freely pivotable under the effects of gravity.

21. A valve arrangement according to claim 12 in which the float is mounted so as to be pivotable in one direction under the influence of gravity and is separately pivotable in the opposite direction under the effect of buoyancy.

22. A valve arrangement according to claim 21 in which the first force causing movement of the actuating member in a first direction is the force produced by the effect of buoyancy on the float, and the second force causing movement of the movable member in a second direction is the force of gravity.

23. A valve arrangement according to claim 1 in which the force of gravity predominates to cause the float to adopt a substantially vertical orientation or a more vertical orientation when the cistern is empty.

24. A valve arrangement according to claim 1 in which the force due to buoyancy on the float predominates to cause the float to adopt a more vertically inclined orientation when the cistern is full of water.

25. A valve arrangement according to claim 24 in which operation of the value is effected by the force of gravity followed by the effect of buoyancy in turn during operation of the cistern to discharge the cistern.

26. A valve arrangement according to claim 1 in which the engagement means of the movable valve member or members is a ring, collar, lip, notch or similar located on the outside surface of the movable member for selective engagement with the locking edge of the float so that the movable member is maintainable in selected open positions in use of the valve arrangement, preferably during flushing of the cistern.

27. A valve arrangement according to claim 1 in which the movable valve member is provided with a sealing arrangement located at or towards the lower end in use for sealingly engaging the outlet, thereby preventing fluid flow when the valve member is in the closed position.

28. A valve arrangement according to claim 27 in which the sealing arrangement is a substantially V-shaped seal or a seal having tapered sides.

29. A valve arrangement according to claim 1 in which the movable valve member or movable valve members are provided with engaging means for co-operatively interacting with the actuating member to maintain the valve member or members in selected locations.

\* \* \* \* \*